(12) United States Patent
Aleo

(10) Patent No.: US 10,300,314 B2
(45) Date of Patent: May 28, 2019

(54) SAFETY ANCHOR ASSEMBLY OF FALL-PROTECTION LIFELINE SYSTEM FOR WORKERS

(71) Applicant: Dino Aleo, Windsor (CA)

(72) Inventor: Dino Aleo, Windsor (CA)

(73) Assignee: AZTRUM CONSULTING & HOLDINGS INC, Windsor, CA (US)

( * ) Notice: Subject to any disclaimer, the term of this patent is extended or adjusted under 35 U.S.C. 154(b) by 43 days.

(21) Appl. No.: 15/147,580

(22) Filed: May 5, 2016

(65) Prior Publication Data

US 2016/0325125 A1    Nov. 10, 2016

Related U.S. Application Data

(60) Provisional application No. 62/157,594, filed on May 6, 2015.

(51) Int. Cl.
*A62B 35/00* (2006.01)
*F16B 7/10* (2006.01)

(52) U.S. Cl.
CPC .......... *A62B 35/0068* (2013.01); *F16B 7/105* (2013.01)

(58) Field of Classification Search
CPC .... A62B 35/0068; F16B 7/105; F16M 13/022
USPC ..... 248/200.1; 182/82; 52/749.12, 704, 707, 52/27, 745.19, 250
See application file for complete search history.

(56) References Cited

U.S. PATENT DOCUMENTS

| | | | | |
|---|---|---|---|---|
| 1,054,246 A | * | 2/1913 | Stauffer | H02G 3/125 248/200.1 |
| 1,085,691 A | * | 2/1914 | Lavers | F16B 21/20 248/200.1 |
| 1,123,882 A | * | 1/1915 | Jensen | B65G 69/00 193/15 |
| 1,485,572 A | * | 3/1924 | Stoltz | B25B 1/2484 248/200.1 |
| 1,766,324 A | * | 6/1930 | Berner | E21F 17/103 160/252 |
| 2,084,925 A | * | 6/1937 | Staten | E21B 15/006 248/200.1 |

(Continued)

FOREIGN PATENT DOCUMENTS

DE    3204212 A1 *  9/1983  ............ E04G 25/04
EP    2097599 B1 *  4/2016  ............... A62B 1/04

*Primary Examiner* — Kimberly T Wood
(74) *Attorney, Agent, or Firm* — Cantor Colburn LLP

(57) ABSTRACT

A safety-anchor assembly of a fall-protection lifeline system for workers configured to be implemented in a work area defining a lower surface and an upper surface spaced from the lower surface, the lower and upper surfaces of the work area each substantially planar and oriented substantially parallel with each other. The safety-anchor assembly includes a base tube and a staff tube adjustably attached to the base tube to form a post shore extending under compression pressure between and frictionally supported upon the lower and upper surfaces of the work area to prevent movement of the post shore with respect to the lower and upper surfaces, an acute angle of about eighty-one degrees being defined between the post shore and the lower surface of the work area and a corresponding obtuse angle of about ninety-nine degrees being defined between the post shore and the upper surface of the work area.

16 Claims, 11 Drawing Sheets

(56) References Cited

U.S. PATENT DOCUMENTS

| | | | | | |
|---|---|---|---|---|---|
| 2,219,169 | A * | 10/1940 | Alter | B60R 11/04 248/200.1 |
| 2,261,061 | A * | 10/1941 | Horton | A47G 25/0664 248/200.1 |
| 2,556,357 | A * | 6/1951 | Baldwin | E21B 15/006 173/145 |
| 2,598,970 | A * | 6/1952 | Buttrick | E21C 29/08 175/315 |
| 2,602,638 | A * | 7/1952 | Slater | E21B 15/006 248/200.1 |
| 2,942,829 | A * | 6/1960 | Stiffel | A47B 91/16 16/42 R |
| 3,025,389 | A * | 3/1962 | Esch | F21S 2/00 248/200.1 |
| 3,143,331 | A * | 8/1964 | Corey | A47B 11/00 248/200.1 |
| 3,822,850 | A * | 7/1974 | Elias | E04G 21/3233 248/200.1 |
| 3,974,995 | A * | 8/1976 | Blonde | E04G 13/066 249/19 |
| 4,101,036 | A * | 7/1978 | Craig | A47B 96/1425 211/107 |
| 4,111,408 | A * | 9/1978 | Love | B05B 15/00 248/200.1 |
| 4,824,302 | A * | 4/1989 | Schultheis | B60P 7/15 211/105.3 |
| 5,536,229 | A * | 7/1996 | Albergo | A63B 21/00047 482/148 |
| 5,924,469 | A * | 7/1999 | Whittemore | A47H 21/00 160/351 |
| 6,401,863 | B1 * | 6/2002 | Kirkland | B66D 3/20 182/142 |
| 6,431,512 | B1 * | 8/2002 | Fox | A47B 21/0314 108/50.02 |
| 6,467,741 | B1 * | 10/2002 | Shih | E04G 25/06 248/200.1 |
| 7,584,932 | B2 * | 9/2009 | Shih | E04G 17/14 248/354.3 |
| 7,810,771 | B1 * | 10/2010 | Akers | E04G 21/24 160/368.1 |
| 8,584,801 | B2 * | 11/2013 | Baxter | B66C 23/205 182/141 |
| 9,663,962 | B1 * | 5/2017 | Whittemore | E04G 21/243 |
| 2002/0139910 | A1 * | 10/2002 | Shih | E04G 25/06 248/200.1 |
| 2006/0289233 | A1 * | 12/2006 | Flaherty | A62B 35/0068 182/45 |
| 2008/0185111 | A1 * | 8/2008 | Zagone | E04G 21/24 160/379 |
| 2008/0250731 | A1 * | 10/2008 | Wheeler | E04B 9/18 52/167.1 |
| 2009/0101774 | A1 * | 4/2009 | Shih | E04G 17/14 248/200.1 |
| 2016/0001003 | A1 * | 1/2016 | Perazzo | B65B 7/2807 53/493 |

\* cited by examiner

SAFETY ANCHOR ASSEMBLY OF FALL-PROTECTION LIFELINE SYSTEM FOR WORKERS

CROSS REFERENCE TO RELATED APPLICATION

The patent application claims priority to U.S. Provisional Patent Application Ser. No. 62/157,594, filed May 6, 2015, which is incorporated herein by reference in its entirety.

FIELD OF THE INVENTION

The invention relates to, generally, a lifeline system to which a worker is attached for horizontal and vertical movement thereof for protection against fall hazards and, more particularly, an assembly of the system configured to serve as a safety tie-off anchor for the worker on primarily commercial-construction projects for concrete-slab applications.

BACKGROUND OF THE INVENTION

In the construction industry, the leading type of hazard is falling. Known lifeline or fall-protection equipment or systems are designed to protect against personal falls from height while at work and can be used for travel restraint or fall arrest.

More specifically, a travel-restraint system, on one hand, allows a construction worker to travel sufficiently far in his/her work for the worker to reach an edge of a building or other structure, but not sufficiently far for him/her to fall over the edge. Toward this end, a lifeline can be adequately anchored at a point of a structure and typically connected directly to a device, such as a D-ring, of a full-body harness of the worker. With this method, a length of the lifeline, measured from the anchor point, is sufficiently short to restrain the worker from any fall hazard. Alternatively, a lanyard is attached to the D-ring and another device, such as a rope grab, which, in turn, is compatibly attached to the lifeline. With this method, the rope grab is prevented from sliding along the lifeline (e.g., use of a knot in the lifeline) to a point where the worker is no longer restrained from his/her falling. With either method, the system must be securely anchored and also adjusted so that the lifeline, when it is fully extended, and/or lanyard, prevents the worker from reaching beyond the edge where the worker may fall.

A fall-arrest system, on the other hand, in the event of a free fall off the structure by the worker, must protect the worker from his/her hitting ground or a next level or any other objects below the work. Toward this end, the fall is limited to a certain distance, and peak fall-arrest force to which the falling worker is subjected is limited to a certain amount. In particular, the harness must be connected to an adequate safety-support, -anchorage, or -anchor assembly via the lifeline or lanyard (possibly equipped with a shock absorber) and lifeline.

In this respect, there are three basic types of safety-anchor assembly. First, a "design fixed" safety-anchor assembly (i.e., load-rated anchor) is specifically designed and permanently installed for fall-protection purposes as an integral part of the structure. An example of such an assembly is a roof anchor on a high-rise building. Second, a "temporary fixed" safety-anchor assembly is designed to be connected to the structure using specific installation instructions. An example of such an assembly is a nail-on anchor used by shinglers. Third, equipment or an existing feature of the structure not intended as respective anchor points may be verified by a professional engineer or competent person as its having adequate capacity to serve as a safety-anchor assembly. Examples of such an assembly are a rooftop mechanical room, structural steel, and a reinforced concrete column. Each of these types of safety-anchor assembly can be used to anchor a travel-restraint or fall-arrest system if the assembly has been installed properly.

Regardless of the type of assembly used, static strength of the assembly is required to meet at least a minimum value. This value depends upon, among other factors, the number of workers attached to the assembly.

Thus, there is a need in the related art for a durable, effective, engineered, ergonomic, reliable, robust, simple, and versatile safety-anchor assembly of a fall-protection lifeline system for workers. More specifically, there is a need in the related art for such an assembly that takes the form of fall-protection tie-off-post-anchor equipment configured to serve as a safety tie-off anchor for workers in specialized applications (e.g., targets primarily commercial-construction projects for concrete-slab applications). There is a need in the related art for such an assembly that also is fixed, light, non-disturbing (i.e., no tool or fastener is required to use the assembly), portable, and temporary. There is a need in the related art for such an assembly that also can be easily transported and quickly set-up. There is a need in the related art for such an assembly that can be also used by more than one worker at a time. There is a need in the related art for such an assembly that also use thereof is practically error-proofed.

SUMMARY OF THE INVENTION

According to an embodiment of the disclosure, provided is a safety-anchor assembly of a fall-protection lifeline system for workers configured to be implemented in a work area defining a lower surface and an upper surface spaced from the lower surface, the lower and upper surfaces of the work area each substantially planar and oriented substantially parallel with each other. The safety-anchor assembly includes a base tube and a staff tube adjustably attached to the base tube to form a post shore extending under compression pressure between and frictionally supported upon the lower and upper surfaces of the work area to prevent movement of the post shore with respect to the lower and upper surfaces, an acute angle of about eighty-one degrees being defined between the post shore and the lower surface of the work area and a corresponding obtuse angle of about ninety-nine degrees being defined between the post shore and the upper surface of the work area.

According to another embodiment of the disclosure, provided is a lifeline system for workers configured to be implemented in a work area defining a lower surface and an upper surface spaced from the lower surface. The system includes a safety-anchor assembly. The assembly includes a base tube and a staff tube adjustably attached to the base tube to form a post shore extending under compression pressure between and frictionally supported upon the lower and upper surfaces of the work area to prevent movement of the post shore with respect to the lower and upper surfaces, an acute angle of about eighty-one degrees being defined between the post shore and the lower surface of the work area and a corresponding obtuse angle of about ninety-nine degrees being defined between the post shore and the upper surface of the work area.

According to yet another embodiment of the disclosure, provided is a lifeline system for workers configured to be implemented in a work area defining a lower surface and an upper surface spaced from the lower surface. The system includes a safety-anchor assembly. The assembly includes a base tube and a staff tube adjustably attached to the base tube to form a post shore extending under compression pressure between and frictionally supported upon the lower and upper surfaces of the work area to prevent movement of the post shore with respect to the lower and upper surfaces, an acute angle defined between the post shore and the lower surface of the work area and a corresponding obtuse angle defined between the post shore and the upper surface of the work area.

Those having ordinary skill in the related art should readily appreciate objects, features, and other advantages of the safety-anchor assembly of a fall-protection lifeline system for workers according to the invention as it becomes more understood while the subsequent detailed description of non-limiting exemplary embodiments of the assembly is read taken in conjunction with an accompanying drawing thereof.

DETAILED DESCRIPTION OF INVENTION

Figure 1:
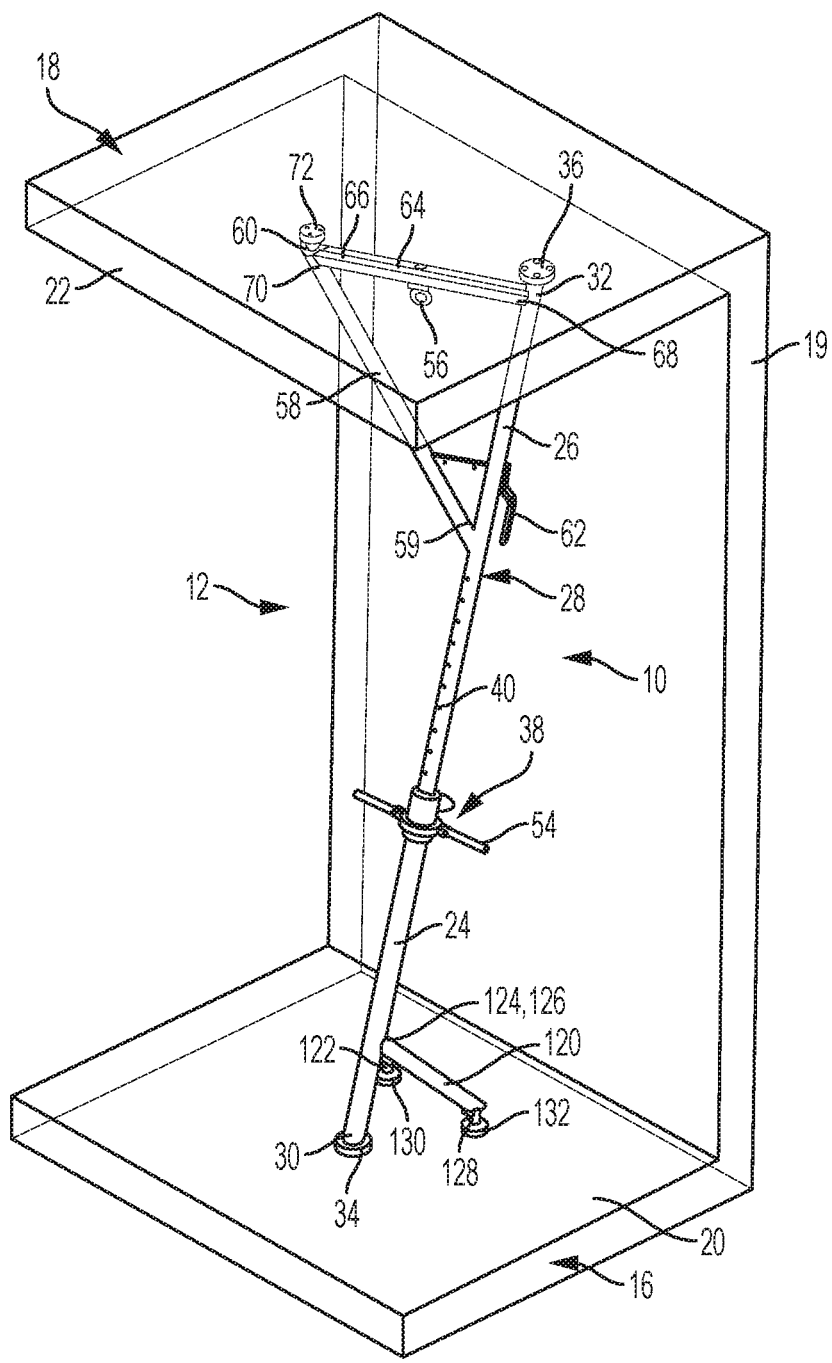
FIG. 1 is an environmental view of a safety-anchor assembly of a fall-protection lifeline system for workers.

Referring now to the figures, throughout which like reference numerals are used to designate like structure, non-limiting exemplary embodiments of a safety-anchor assembly of a fall-protection lifeline system for workers according to the invention is generally indicated at 10. The assembly 10 is described below and/or shown in the figures being implemented in the construction industry as part of a lifeline system, generally indicated at 12, to which at least one construction worker is attached for horizontal and vertical movement thereof for protection against fall hazards on primarily commercial-construction projects for concrete-slab applications. However, it should be appreciated by those having ordinary skill in the related art that the assembly 10 can be implemented in any suitable type of industry. It should be so appreciated also that the assembly 10 can be implemented with any suitable type of lifeline system 12. It should be so appreciated also that the assembly 10 can be implemented with one or two workers. It should be so appreciated also that the assembly 10 can be implemented with any suitable type of project, in general, and construction project, in particular. It should be so appreciated also that the assembly 10 can be implemented with any suitable application. It should be so appreciated also that the assembly 10 can be implemented as a travel-restraint or fall-arrest system.

Referring now to FIG. 1, the lifeline system 12 is configured to be implemented in a work area, generally indicated at 14. The work area 14 defines, among other things, a square lower concrete slab, generally indicated at 16, acting as a floor 16 of the work area 14. A square upper concrete slab, generally indicated at 18, is identical to, spaced from, and aligned and parallel with the lower concrete slab 16 and acts as a ceiling 18 of the work area 14. A rectangular concrete slab 19 is disposed between and perpendicular to the lower and upper concrete slabs 16, 18, is aligned flush with and connected to corresponding sides of the lower and upper concrete slabs 16, 18, and acts as a wall 19 of the work area 14. In turn, the lower concrete slab 16 defines a lower surface 20 of the work area 14, and the upper concrete slab 18 defines an upper surface 22 of the work area 14. In a non-limiting exemplary embodiment, each of the lower and upper surfaces 20, 22 is planar and substantially horizontal, and the lower and upper surfaces 20, 22 are substantially parallel with each other.

It should be appreciated by those having ordinary skill in the related art that the work area 14, in general, and each of the floor 16, ceiling 18, wall 19, and lower and upper surfaces 20, 22, in particular, can have any suitable shape, size, and structure. It should be so appreciated also that the floor 16, ceiling 18, wall 19, and lower and upper surfaces 20, 22 can have any suitable relationship with each other. It should be so appreciated also that each of the floor 16, ceiling 18, wall 19, and lower and upper surfaces 20, 22 can be made of any suitable material. It should be so appreciated also that the floor 16, ceiling 18, wall 19, and lower and upper surfaces 20, 22 play no part of the assembly 10, in particular, and lifeline system 12, in general.

Figure 2:
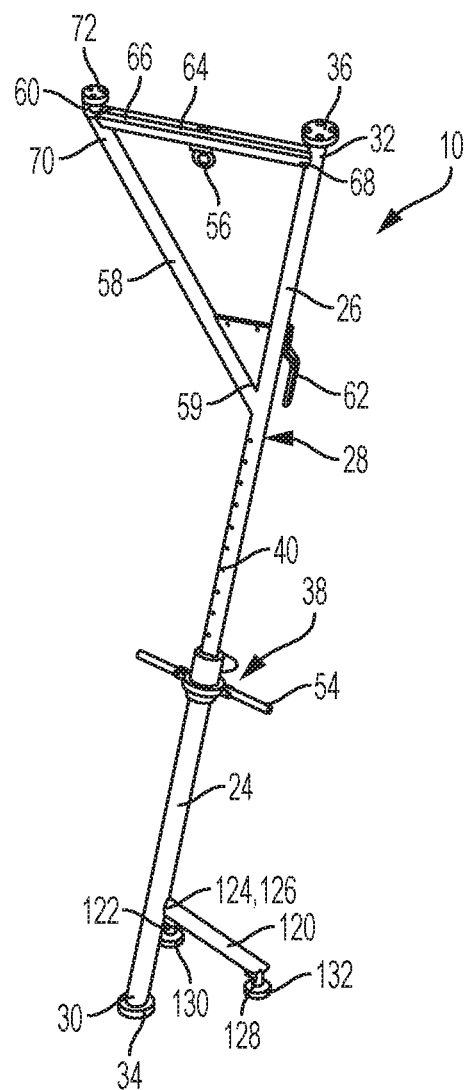
FIG. 2 is a perspective view of the safety-anchor assembly.

Referring now to FIGS. 1 and 2, the assembly 10 comprises, in general, a base tube, generally indicated at 24, and staff tube, generally indicated at 26, adjustably attached to the base tube 24 to form a post shore, generally indicated at 28, extending under compression pressure between and frictionally supported upon the lower and upper surfaces 20, 22 of the work area 14 to prevent movement (e.g., sliding) of the post shore 28 with respect to the lower and upper surfaces 20, 22. An acute angle "α" (FIG. 1) of about eighty-one degrees is defined between the base tube 24 and lower surface 20 of the work area 14 (i.e., an obtuse angle of about ninety-nine degrees defined so therebetween or acute angle of about nine degrees defined between the base tube 24 and an imaginary line running perpendicular to the lower and upper surfaces 20, 22). In turn, a corresponding obtuse angle "β" (FIG. 1) of about ninety-nine degrees is defined between the staff tube 26 and upper surface 22 of the work area 14. (i.e., an acute angle of about eighty-one degrees defined so therebetween or acute angle of about nine degrees defined between the staff tube 26 and the imaginary perpendicular line). However, those having ordinary skill in the related art should appreciate that each of the angles "α," "β" can be any suitable measure of degrees. For example, the acute angle α ranges from about 5 degrees to about 20 degrees in some embodiments and obtuse angle β ranges from about 70 degrees to about 85 degrees in such embodiments.

In an embodiment, an entirety of each of the base and staff tubes 24, 26 and, thus, post shore 28 is substantially straight. Furthermore, each of the base and staff tubes 24, 26 and, thus, post shore 28 defines a substantially round or square transverse cross-section. In addition, the base and staff tubes 24, 26 are in mating relationship with each other. In an aspect of the embodiment, the base tube 24 matingly receives the staff tube 26. Toward that end, the base tube 24 defines a diameter of the base tube 24, and the staff tube 26 defines a diameter of the staff tube 26 smaller than the diameter of the base tube 24. Because the post shore 28 is disposed offset from the imaginary perpendicular line, the post shore 28 is disposed non-perpendicularly to the lower and upper surfaces 20, 22 of the work area 14.

Figure 8:
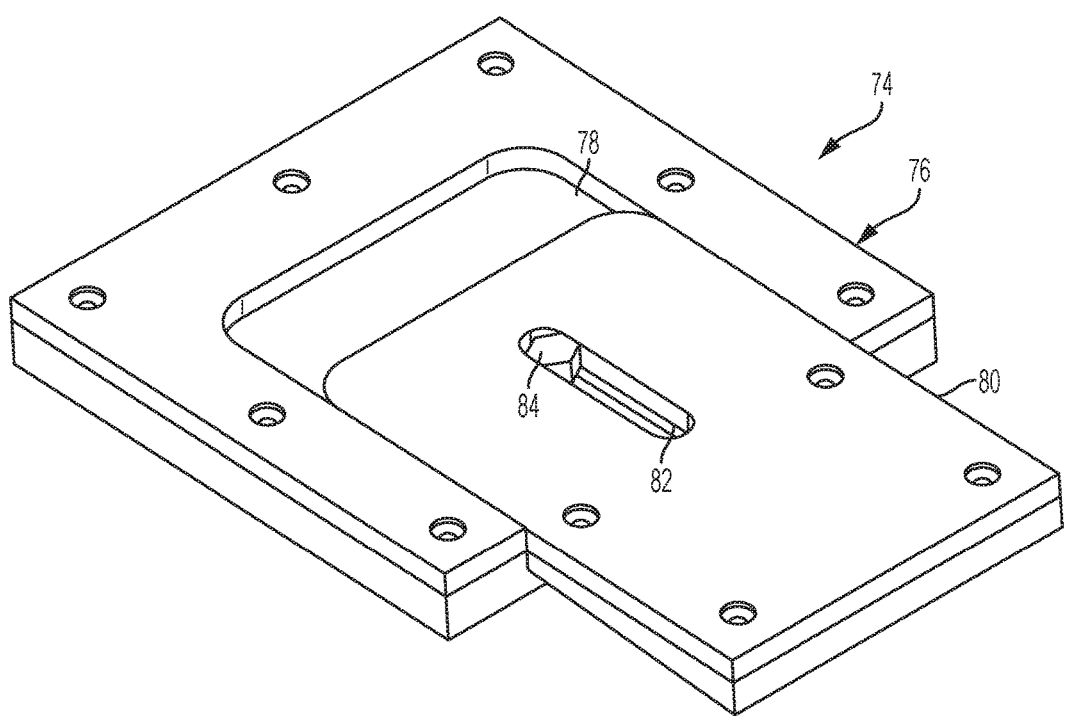
FIG. 8 is a perspective view of a shim assembly configured to be employed by each support plate of the assembly.
Figure 9:
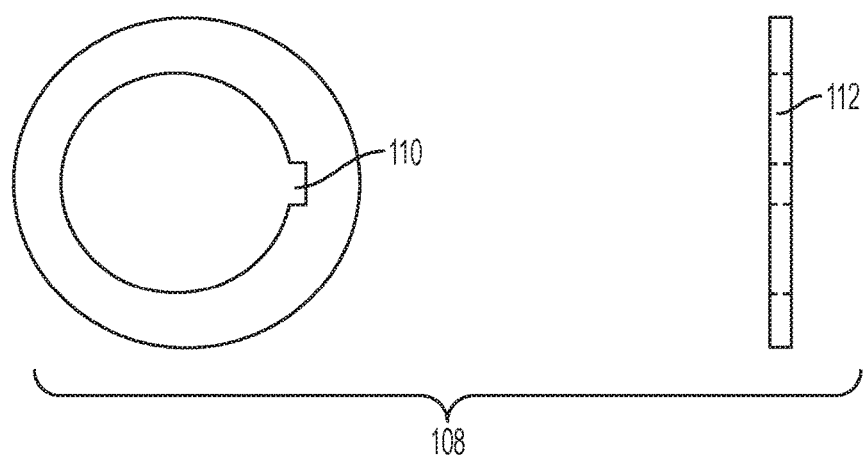
FIG. 9 illustrates a keyway feature of the assembly.

It should be appreciated by those having ordinary skill in the related art that the post shore 28, in general, and each of the base and staff tubes 24, 26, in particular, can have any suitable shape, size, and structure. It should be so appreciated also that the base and staff tubes 24, 26 can have any suitable relationship with each other. It should be so appreciated also that the staff tube 26 can matingly receive the base tube 24. To ensure proper relative orientation of the tubes 24, 26, a keyway 108 is provided as shown in FIGS. 2 and 8. In the illustrated embodiment, the base tube 24 includes a receiving feature 110, such as a slot or the like, and the staff tube 26 includes a protrusion 112 extending from the staff tube 26. The receiving feature 110 and the protrusion 112 are sized to fittingly mate. In an alternative embodiment, the base tube 24 includes the protrusion 112 and the staff tube 26 includes the receiving feature 110. Use the keyway feature 108 properly positions and orients the tubes 24, 26 during assembly, thereby providing a user a less complicated and time consuming assembly process.

The post shore 28 defines first and second ends 30, 32 of the post shore 28, and the assembly 10 comprises further a first support plate 34 positioned between and contacting the first end 30 and lower surface 20 of the work area 14 for supporting the first end 30 on the lower surface 20. A second support plate 36 is positioned between and contacting the second end 32 of the post shore 28 and upper surface 22 of the work area 14 for supporting the second end 32 on the upper surface 22. In an embodiment, the first and second ends 30, 32 of the post shore 28 are integrally connected to the first and second support plates 34, 36, respectively. The first and second support plates 34, 36 are under compression pressure and frictionally supported upon the lower and upper surfaces 20, 22, respectively, of the work area 14. More specifically, the post shore 28 exerts a downward-acting force upon the first support plate 34 to support the first support plate upon the lower surface 20 of the work area 14, and the post shore 28 exerts an upward-acting force upon the second support plate 36 to support the second support plate 36 upon the upper surface 22 of the work area 14. A side of the second support plate 36 may abut the concrete wall 19.

In an embodiment, the first and second support plates 34, 36 are disposed substantially parallel with the lower and upper surfaces 20, 22, respectively, of the work area 14. In the illustrated embodiment, each of the first and second support plates 34, 36 is substantially round, but it is to be appreciated that each of the first and second support plates 34, 36 can have any suitable shape, size, and structure, such as square, for example.

Also in an embodiment, the first and second ends 30, 32 of the post shore 28 are disposed substantially symmetrical with the first and second support plates 34, 36, respectively. Furthermore, it should be so appreciated also that the first and second support plates 34, 36 can have any suitable relationship with the first and second ends 30, 32 of the post shore 28, respectively, and upper surface 22 of the work area 14. It should be so appreciated also that the first and second ends 30, 32 of the post shore 28 can be connected to the first and second support plates 34, 36, respectively, in any suitable manner, whether directly or indirectly.

As shown in FIGS. 1 and 2, the assembly 10 includes a plurality of braces extending from, and operatively coupled to, the base tube 24. In the illustrated embodiment, a first brace 120 and a second brace 122 are provided. The braces 120, 122 are included to provide additional stability during assembly and installation and the safety factor for incidental, anti-slip support is increased. The braces 120, 122 are attached to the base tube 24 at respective first ends 124, 126. At respective second ends 128, 130 of the braces 120, 122, an adjustable pad 132 is coupled to the braces 120, 122. The adjustable pad 132 of each brace is adjustable in an extendable and retractable manner to allow for height adjustment. Additionally, the adjustable pad 132 of each brace is adjustable in a pivotable manner to facilitate swiveling of the adjustable pad 132 to accommodate setting the assembly 10 up on surfaces with a sloped surface.

Referring now to FIGS. 1-7, the assembly 10 is of "telescoping" design. In an embodiment, the assembly 10 comprises further an attachment mechanism, generally, indicated at 38, for telescopingly adjusting the base and staff tubes 24, 26 with respect to each other and, thus, an operative length (i.e., an application height) of the post shore 28 of up to about eight to about ten feet. In an aspect of the embodiment, the attachment mechanism 38 includes opposed series of substantially equally spaced holes 40 defined along a portion and through an entirety of the post shore 28 and substantially aligned with each other. Each corresponding pair of opposed holes 40 is configured to matingly receive a removable pin 42 for telescopingly adjusting the application height of the post shore 28 and locking the base and staff tubes 24, 26 to each other for determining the application height of the post shore 28.

More specifically, the base tube 24 defines at least one of the pairs of opposed holes 40, and the staff tube 26 defines a plurality of the pairs of opposed holes 40. In an aspect, both the base and staff tubes 24, 26 define a plurality of the pairs of opposed holes 40. Also in an aspect, as shown in FIGS. 1-5, the pin 42 is connected to an upper portion of an exterior surface (i.e., a collar) of the base tube 24 with a chain 44 so that the pin 42 is not loose or lost.

The attachment mechanism 38 includes also a plurality of threads 46 defined along a portion of an exterior surface of the post shore 28. In an aspect, the threads 46 of the post shore 28 are defined along the collar of the base tube 24. An elongated aperture 48 is defined in the threads 46 along the post shore 28 to expose the holes 40 of the post shore 28.

The threads 46 are configured to threadingly receive a load washer, generally indicated at 50. Toward that end, the load washer 50 includes a plurality of threads 52 (FIGS. 3, 5, and 7) defined along an interior surface of the load washer 50. In an aspect, the threads 52 are defined along an entirety of the interior surface of the load washer 50.

In an aspect, the load washer 50 includes also at least one handle 54 configured to be used to finely adjust a position of the load washer 50 along the post shore 28 after the post shore 28 is in position. In a version of this aspect, the handle 54 is configured to be pivoted, rotated, or otherwise moved out of the way and positioned against the threads 46 of the post shore 28. In an example of the load washer 50 shown in FIGS. 1-5, the load washer 50 includes a pair of handles 54 positioned on opposite sides of the post shore 28.

It should be appreciated by those having ordinary skill in the related art that the assembly 10 can have any suitable "height adjustment" design. It should be so appreciated also that the attachment mechanism 38 can have any suitable shape, size, and structure. It should be so appreciated also that the attachment mechanism 38 can have any suitable relationship with a remainder of the assembly 10. It should be so appreciated also that the base and staff tubes 24, 26 can be telescopingly adjusted with respect to each other in any suitable manner. It should be so appreciated also that the application height of the post shore 28 can be adjusted to any suitable height.

Figure 10:
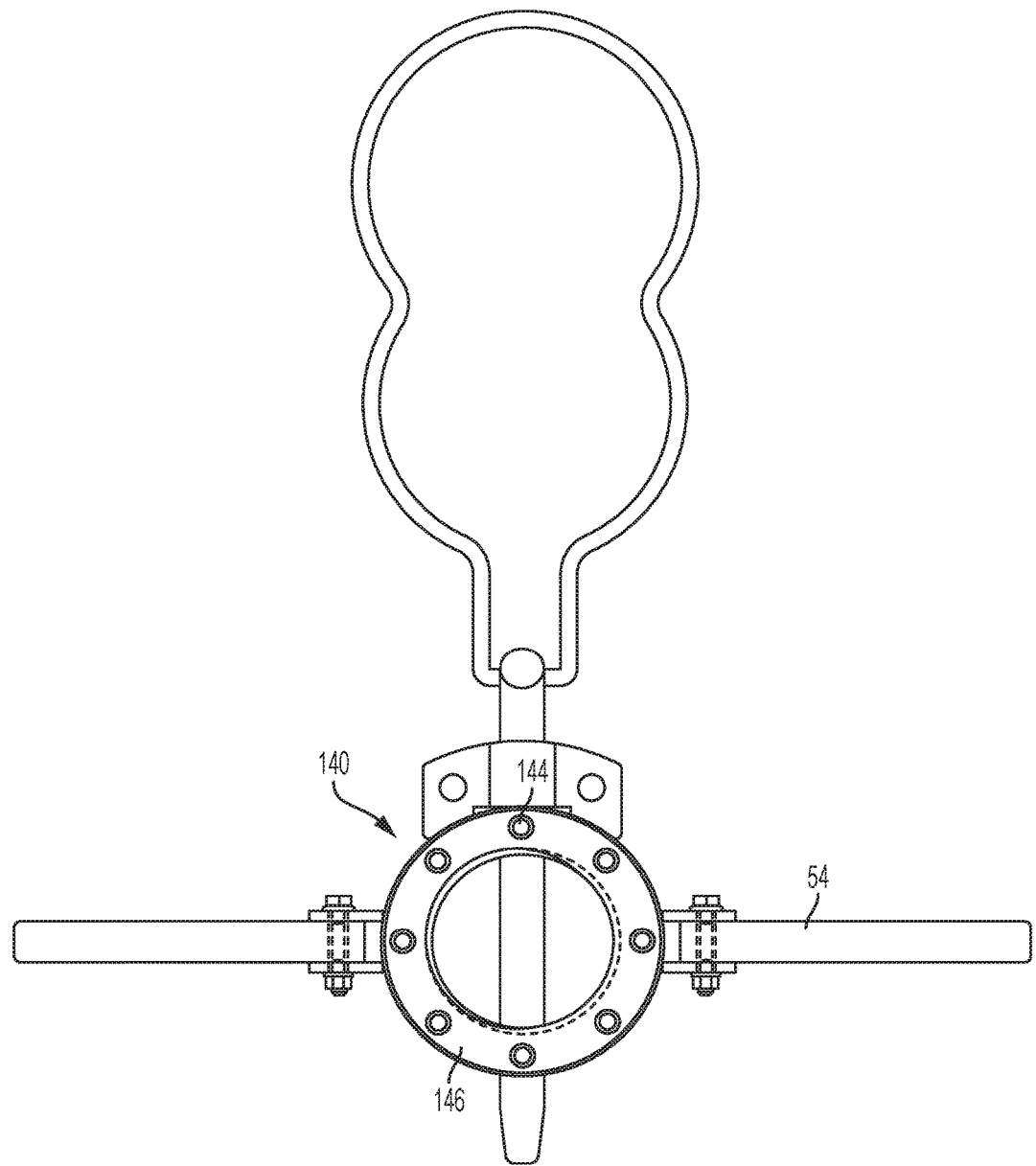
FIG. 10 is a plan view of a locking assembly of the assembly.
Figure 11:
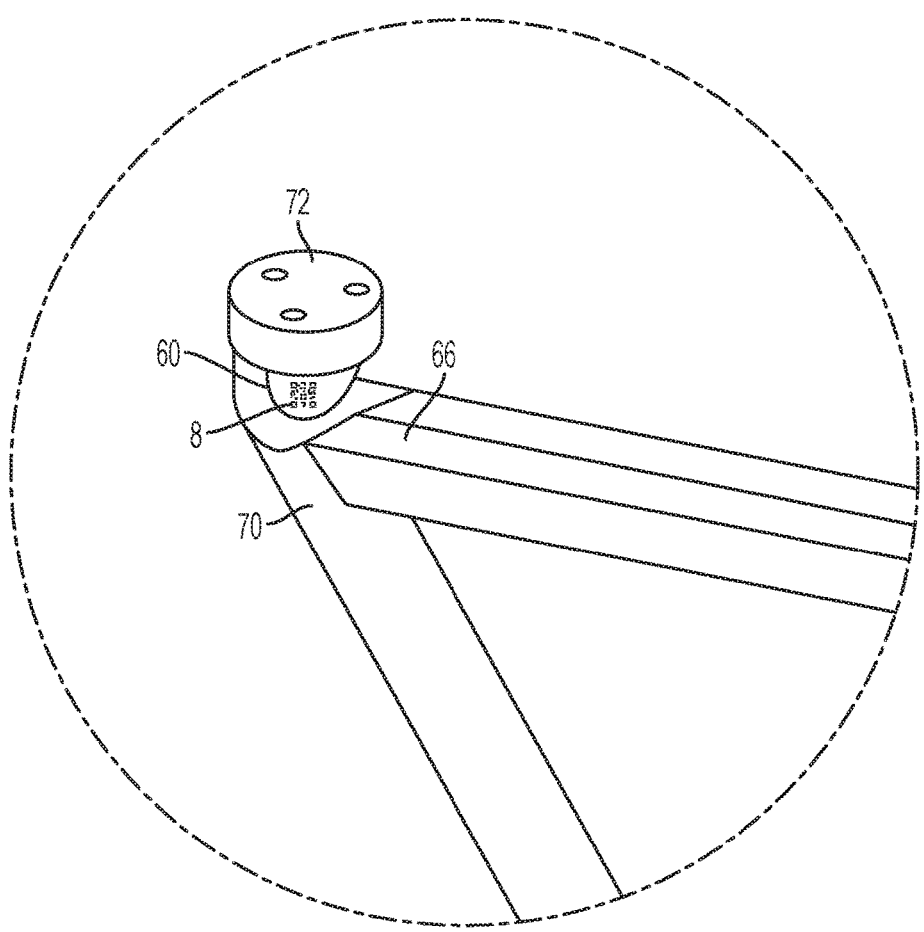
FIG. 11 is a perspective view of a gusset having a scannable image thereon.

The assembly 10 includes a locking assembly 140 (FIGS. 2, 4 and 10) to ensure that the assembly is not stolen. Furthermore, the locking assembly 140 even prevents adjustment of the post shore height. This is particularly advantageous, for example, when the assembly 10 is in an installed position at a work site and is required to be left overnight. The locking assembly 140 includes a tab 142 that extends substantially perpendicularly from the pin 42 that fixes the base tube 24 to the staff tube 26. The tab 142 is dimensioned to seat within one of a plurality of holes 144 defined by a collar 146 secured to the post shore 28. The tab 142 includes a hole extending therethrough and in alignment with the hole of the collar 146 that the tab 142 is seated within. A lock extends through the tab hole and the collar hole and is placed in a locked condition to prevent rotation of the staff tube 26. Therefore, adjustment and removal of the assembly 10 is prevented with the locking assembly 140.

It should be appreciated by those having ordinary skill in the related art that each of the holes 40 can have any suitable shape and size and the holes 40 can have any suitable relationship with each other and a remainder of the assembly 10. It should be so appreciated also that the holes 40 can receive the pin 42 in any suitable manner. It should be so appreciated also that the pin 42 can have any suitable shape, size, and structure any suitable relationship with the holes 40 and a remainder of the assembly 10. It should be so appreciated also that the assembly 10, in general, and each of the base and staff tubes 24, 26, in particular, can define any suitable number of the pairs of opposed holes 40. It should be so appreciated also that the pin 42 can be connected to any suitable location of the assembly 10 in any suitable manner. It should be so appreciated also that the chain 44 can have any suitable shape, size, and structure and relationship with a remainder of the assembly 10.

It should be appreciated by those having ordinary skill in the related art that the attachment mechanism 38 can include any suitable number of threads 46. It should be so appreciated also that the threads 46 of the post shore 28 can have any suitable shape, size, and structure and relationship with each other and a remainder of the assembly 10. It should be so appreciated also that the threads 46 of the post shore 28 can be located on any portion of the post shore 28. It should be so appreciated also that the aperture 48 of the post shore 28 can have any suitable shape, size, and structure and relationship with a remainder of the assembly 10. It should be so appreciated also that the post shore 28 can receive the load washer 50 in any suitable manner. It should be so appreciated also that the load washer 50 can include any suitable number of threads 52. It should be so appreciated also that the threads 52 of the load washer 50 can have any suitable shape, size, and structure and relationship with each other and a remainder of the assembly 10. It should be so appreciated also that the threads 52 of the load washer 50 can be located on any portion of the load washer 50.

It should be appreciated by those having ordinary skill in the related art that the load washer 50 can include any suitable number of handles 54. It should be so appreciated also that each handle 54 can finely adjust the position of the load washer 50 and be pivoted, rotated, or otherwise moved out of the way in any suitable manner.

The assembly 10 comprises further at least one swivel D-ring 56 configured to be used as a tie-off point for a lifeline (not shown) of the lifeline system 12. In an embodiment, the D-ring 56 is integrally connected to an upper portion of an exterior surface (i.e., a collar) of the staff tube 26. It should be appreciated by those having ordinary skill in the related art that the D-ring 56 can have any suitable shape, size, and structure and relationship with a remainder of the assembly 10 and lifeline. It should be so appreciated also that any suitable structural element can be used as the tie-off point for the lifeline.

Figure 3:
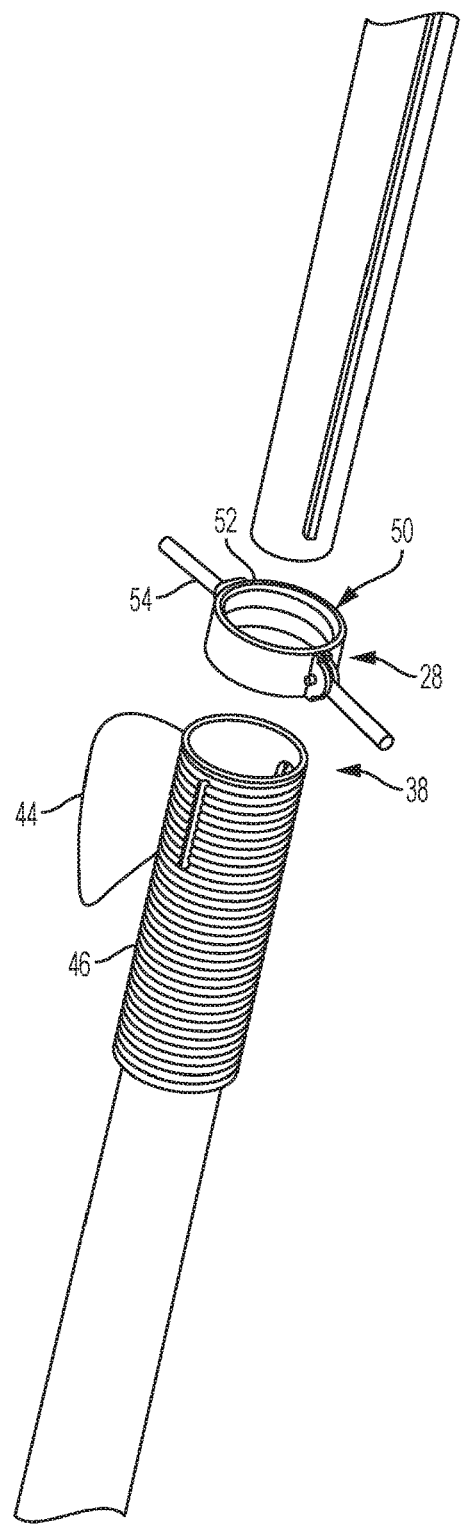
FIG. 3 is a partially disassembled view of a portion of the assembly.
Figure 4:
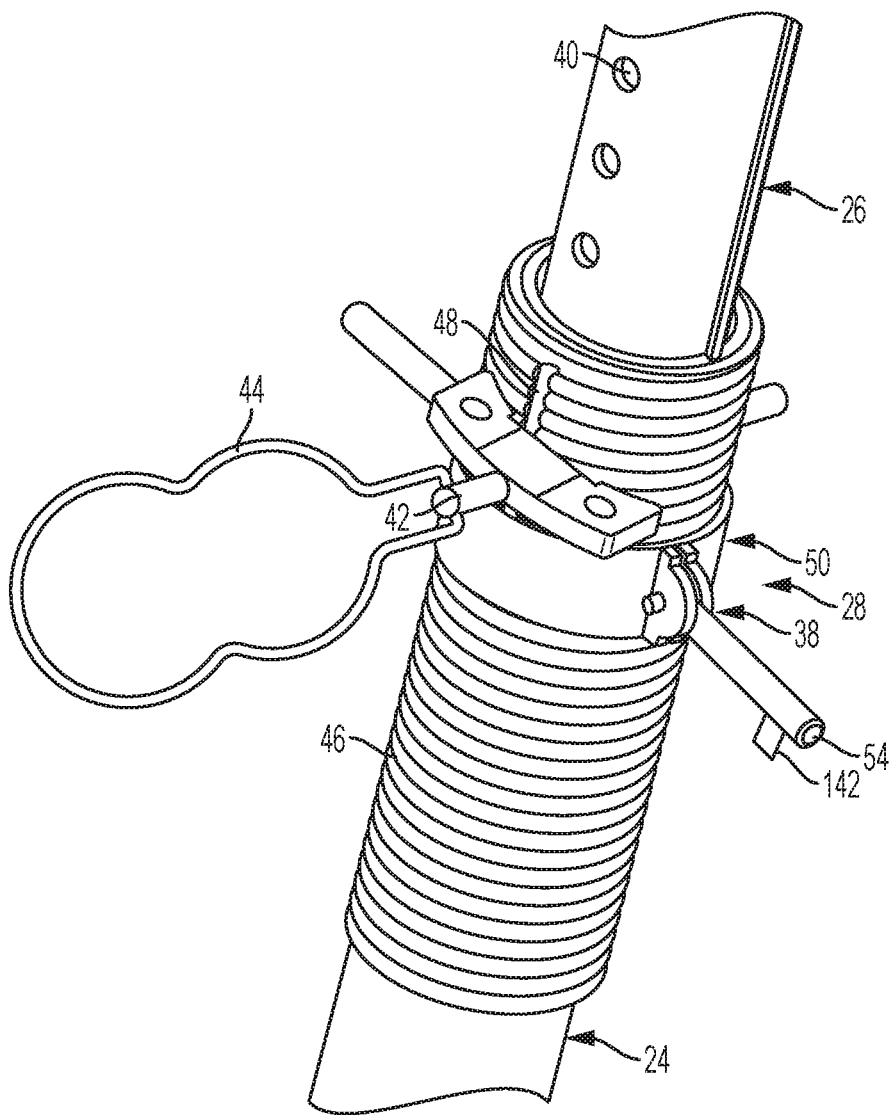
FIG. 4 is an enlarged view of an attachment mechanism of the assembly illustrated in FIGS. 1 and 2.
Figure 5:
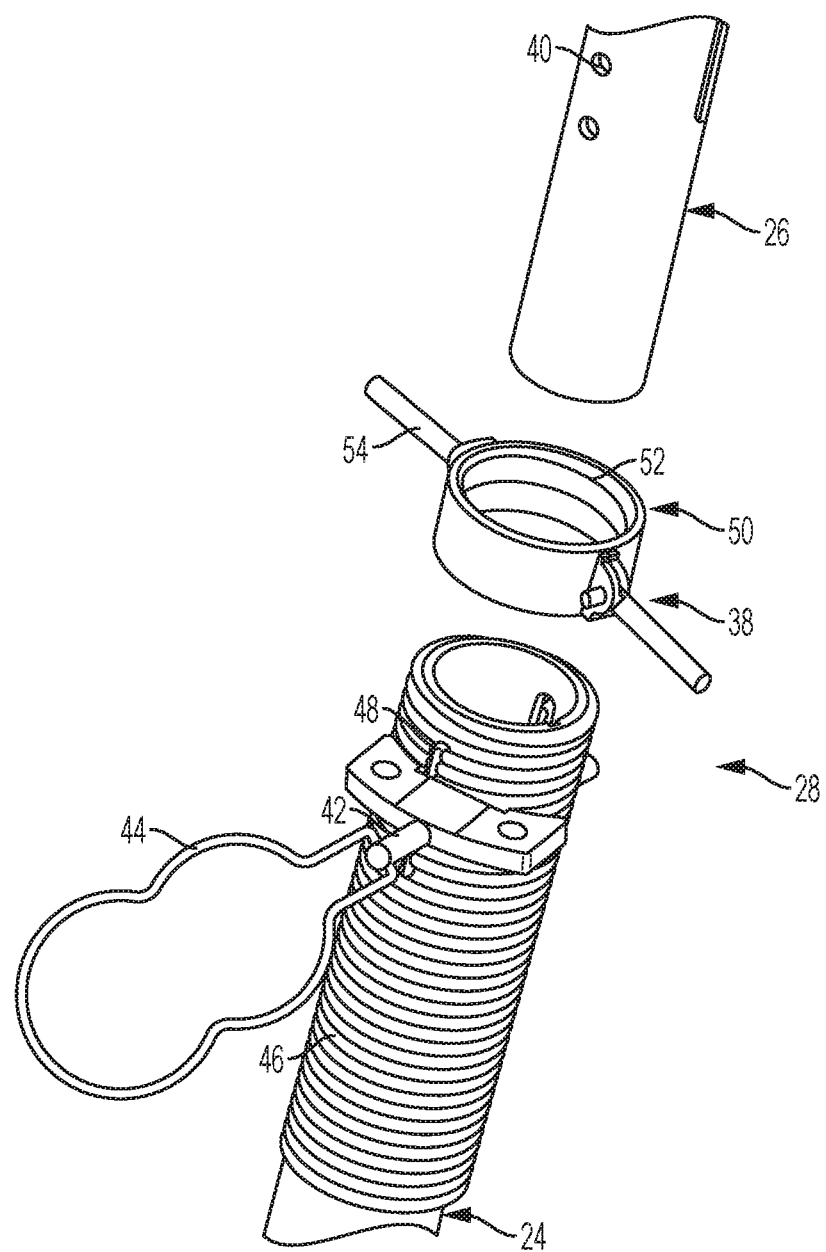
FIG. 5 is a disassembled view of the attachment mechanism illustrated in FIG. 4.
Figure 6:
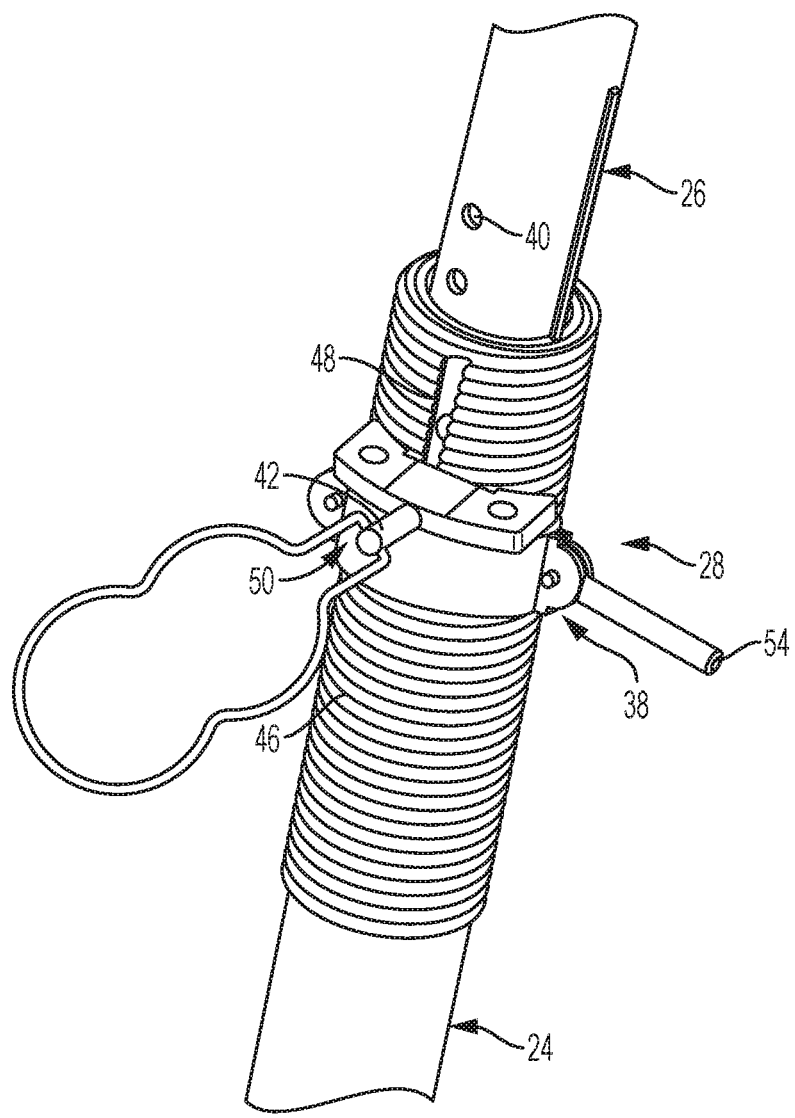
FIG. 6 is an enlarged view of the attachment mechanism of the assembly according to another aspect of the invention.
Figure 7:
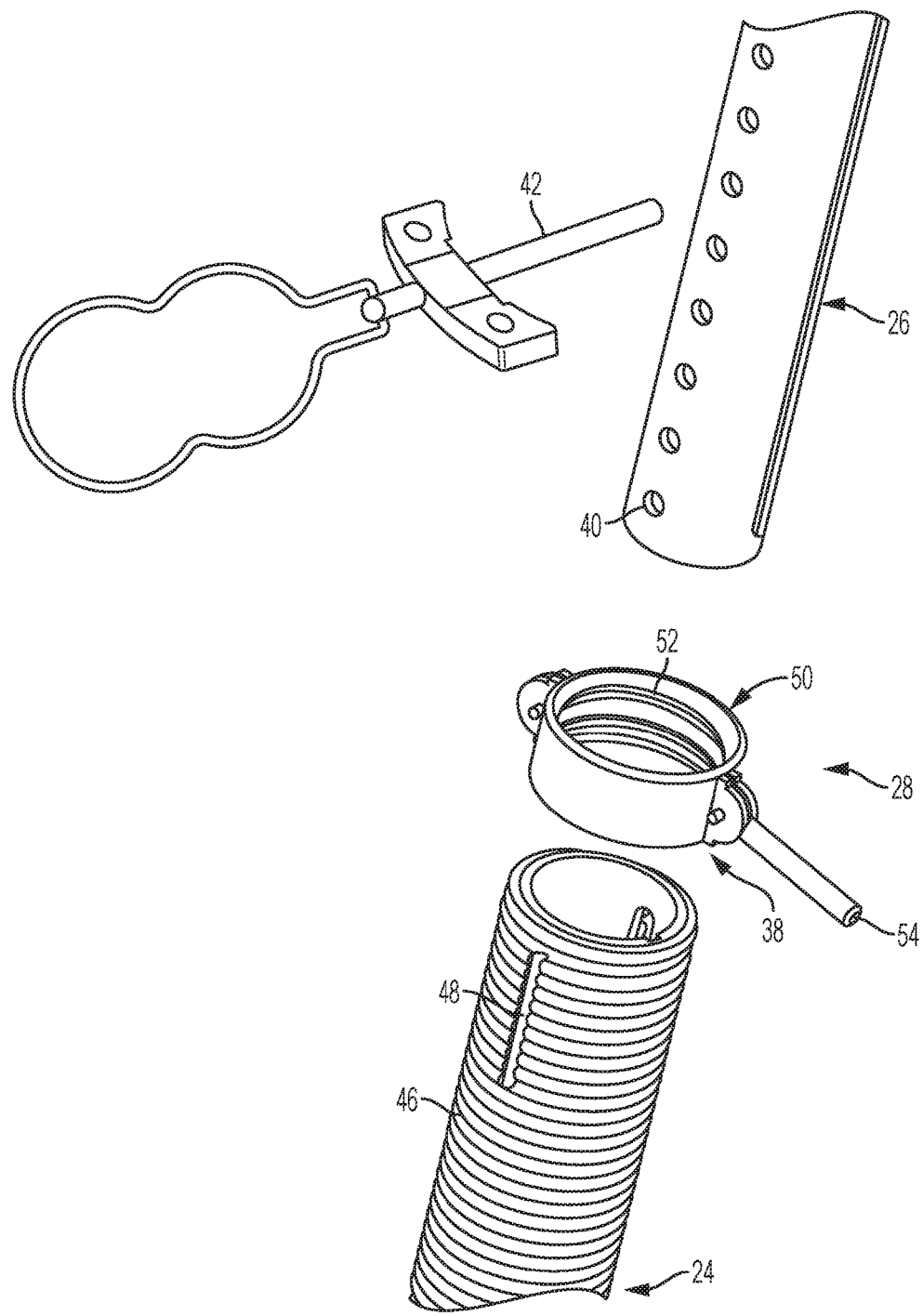
FIG. 7 is a disassembled view of attachment mechanism illustrated in FIG. 6.

Referring now to FIGS. 1-3, the assembly 10 comprises further a support tube, generally indicated at 58, extending non-vertically between the post shore 28 and the upper surface 22 of the work area 14. The support tube 58 is integrally connected to the post shore 28 and frictionally supported upon the upper surface 22 of the work area 14 to prevent movement of the support tube 58 with respect to the upper surface 22. More specifically, the post shore 28 exerts an upward-acting force upon the support tube 58 to support the support tube 58 upon the upper surface 22 of the work area 14. In an embodiment, an entirety of the support tube 58 is substantially straight. Furthermore, the support tube 58 defines a substantially round or square transverse cross-section. In an aspect of the embodiment, a first end 59 of the support tube 58 is connected to the staff tube 26. In a version of this aspect, the first end 59 of the support tube 58 is connected to the staff tube 26 substantially halfway along the staff tube 26.

An acute angle "γ" (FIG. 1) of certain degree is defined between the support tube 58 and upper surface 22 of the work area 14. In turn, a corresponding obtuse angle "δ" (FIG. 1) of certain degree is defined between the support tube 58 and post shore 28. In this way and as seen in the figures, a combination of the base, staff, and support tubes 24, 26, 58 defines a substantially "y" longitudinal cross-section.

Those having ordinary skill in the related art should appreciate that the support tube 58 can have any suitable shape, size, and structure and relationship with a remainder of the assembly 10. It should be so appreciated also that the support tube 58 can be connected to any suitable portion of the post shore 28 in any suitable manner. It should be so appreciated also that each of the angles "γ," "δ" can be any suitable measure of degrees. It should be so appreciated also that the combination of the base, staff, and support tubes 24, 26, 58 can define any suitably shaped longitudinal cross-section.

Space is defined between the cross tube 64 and support tube 58. The assembly 10 comprises further a plate 60 extending within a portion of such space between the cross tube 64 and support tube 58 and connected to the cross tube 64 and support tube 58. The plate 60 provides structural integrity to the assembly 10. In an embodiment, the plate 60 is a substantially triangular Gusset plate 60 fittingly positioned at and near a vertex of an acute angle "ε" (FIG. 1) defined by intersection of the cross tube 64 and support tube 58 with each other. In an aspect of the embodiment, the plate 60 is integrally connected to the cross tube 64 and support tube 58.

Those having ordinary skill in the related art should appreciate that the plate 60 can have any suitable shape, size, and structure. It should be so appreciated also that the plate 60 can be found in any suitable location of the assembly 10 and connected to the post shore 28 and support tube 58 in any suitable manner. It should be so appreciated also that the angle "ε" can be any suitable measure of degrees.

The gusset plate 60 includes one or more holes to be used for attachment of a safety sling thereto. Additionally, the gusset plate 60 includes a pouch made of plastic or the like that is attached thereto. The pouch provides a space for an instruction manual to be inserted, thereby increasing the likelihood that the instruction manual remains with the assembly 10 at all times. In the event that the instruction manual is removed from the pouch and not immediately available to a user, a scannable image 8, such as a QR code, is printed on the gusset plate 60. The scannable image 8 allows a user to quickly scan the image with a device, such as a cellular phone, to immediately download the instruction manual. It is to be appreciated that the scannable image 8 may be printed on another component of the assembly 10. This enhances the safety of the assembly 10 by promoting appropriate use.

The assembly 10 comprises further a handle 62 configured to be used for carrying the assembly 10. In the illustrated embodiment, the handle 62 is a substantially rectilinear bar. The handle 62 is operatively coupled to, or is integrally formed with, an outer surface of the post shore 28. While it is contemplated that the handle 62 is positioned anywhere along the post shore 28, in the illustrated embodiment the handle 62 is positioned proximate the intersection of the post shore 28 and the support tube 58.

Those having ordinary skill in the related art should appreciate that the handle 62 can have any suitable shape, size, and structure. It should be so appreciated also that the handle 62 can be found in any suitable location of the assembly 10 and connected to the support tube 58 in any suitable manner.

The assembly 10 comprises further a cross tube, generally indicated at 64, extending along and frictionally supported upon the upper surface 22 of the work area 14 and connected to the post shore 28 and support tube 58. More specifically, each of the post shore 28 and support tube 58 exerts an upward-acting force upon the cross tube 64 to support the cross tube 64 upon the upper surface 22 of the work area 14. In an embodiment, the cross tube 64 extends substantially horizontally along the upper surface 22 of the work area 14. Furthermore, an entirety of the cross tube 64 is substantially straight. In addition, the cross tube 64 defines a substantially round or square transverse cross-section. In an aspect of this embodiment, the cross tube 64 is integrally connected to the post shore 28 and support tube 58. As seen in the figures, a combination of the staff, support, and cross tubes 26, 58, 64 defines a scalene triangle (i.e., defining unequal sides and angles).

Those having ordinary skill in the related art should appreciate that the cross tube 64 can have any suitable shape, size, and structure and relationship with a remainder of the assembly 10. It should be so appreciated also that the cross tube 64 can be connected to the post shore 28 and support tube 58 in any suitable manner. It should be so appreciated also that the combination of the staff, support, and cross tubes 26, 58, 64 can define any suitable shape.

The cross tube 64 defines first and second ends 66, 68 of the cross tube 64, and the support tube 58 defines a second end 70 of the support tube 58. The assembly 10 comprises further a third support plate 72 positioned between and contacting the second end 70 of the support tube 58 and upper surface 22 of the work area 14 for supporting the second end 70 of the support tube 58 on the upper surface 22. In an embodiment, the first end 66 of the cross tube 64 is integrally connected to the third support plate 72, and the second end 68 of the cross tube 64 is integrally connected to the second support plate 36 of the assembly 10. The third support plate 72 is under compression pressure and frictionally supported upon the upper surface 22 of the work area 14. More specifically, the support tube 58 exerts an upward-acting force upon the third support plate 72 to support the third support plate 72 upon the upper surface 22 of the work area 14. In an aspect of this embodiment, the third support plate 72 is substantially square and disposed substantially parallel with the upper surface 22 of the work area 14. Moreover, the second end 70 of the support tube 58 is disposed substantially symmetrical with the third support plate 72. A side of the third support plate 72 may abut the concrete wall 19.

It should be appreciated by those having ordinary skill in the related art that the third support plate 72 can have any suitable shape, size, and structure. It should be so appreciated also that the third support plate 72 can have any suitable relationship with the first end 66 of the cross tube 64, second end 70 of the support tube 58, and upper surface 22 of the work area 14. It should be so appreciated also that the first end 66 of the cross tube 64 can be connected to the third support plate 72 and the second end 68 of the cross tube 64 can be connected to the second support plate 36 in any suitable manner.

Referring now to FIG. 8, in an embodiment, the assembly 10 comprises further at least one shim assembly, generally indicated at 74, configured to be self-retained between the first, second, or third support plate 34, 36, 72 and the corresponding lower or upper surface 20, 22 of the work area 14. In an aspect of this embodiment, each support plate 34, 36, 72 employs the shim assembly 74. More specifically, each shim assembly 74 includes a first plate, generally indicated at 76, defining a substantially square cross-section. A recess 78 is formed on and partially into a face of the first plate 76 and defines a substantially square cross-section. The recess 78 extends to and through part of an upper portion of a side (partially open side) of the first plate 76. A second plate, generally indicated at 80, defines a substantially rectangular longitudinal cross-section. Placement of the first and second plates 76, 80 with respect to each other is configured to be adjustable in a continuous manner for adjusting a length of the shim assembly 74. In particular, the second plate 80 is configured to matingly slide into and out of the recess 78 in a continuous manner for so adjusting. When the second plate 80 completely fills the recess 78, a portion of the second plate 80 extends beyond the partially open side of the first plate 76. A slot 82 is defined on and partially into a face of the second plate 82 and defines a substantially elliptical longitudinal cross-section. A fastener 84 is disposed within the slot 82 and configured to adjustably slide along the recess 78 in a continuous manner. Upon placement of the first and second plates 76, 80 with respect to each other and the slot 82 and fastener 84 with respect to each other to a desired length of the shim assembly 74, the first and second plates 76, 80 are fastened in place to each other to fix such length.

The shim assemblies 74 increase friction between the first, second, and third support plates 34, 36, 72 and the corresponding lower or upper surface 20, 22 (the friction related to the first support plate 34 acting in a direction opposite that related to each of the second and third support plates 36, 72). In this way, the shim assemblies 74 prevent sliding of the assembly 10 during and after set-up of the assembly 10 and improve reliability of and increase redundancy/safety margin to the assembly 10.

It should be appreciated by those having ordinary skill in the related art that each shim assembly 74, in general, and each of the first and second plates 76, 80 and fastener 84, in particular, can have any suitable shape, size, and structure. It should be so appreciated also that each of the recess 78 and slot 82 can have any suitable shape and size. It should be so appreciated also that the first and second plates 76, 80, fastener 84, recess 78, and slot 82 can have any suitable relationship with each other. It should be so appreciated also that the first and second plates 76, 80 can be adjusted with respect to each other in any suitable manner. It should be so appreciated also that the shim assembly 74 can have any suitable relationship with the first, second, or third support plate 34, 36, 72 and the corresponding lower or upper surface 20, 22 of the work area 14. It should be so appreciated also that shim assembly 74 can be self-retained between the first, second, or third support plate 34, 36, 72 and the corresponding lower or upper surface 20, 22 in any suitable manner. It should be so appreciated also that the shim assembly 74 can be made of any suitable material.

Each of the assembly 10, in general, and its components, in particular, is made by high-quality processes and of high-quality materials. In an embodiment, the assembly 10 is made of aluminum, stainless steel, or high-performance composite components. In an aspect of the embodiment, the aluminum is powder-coated or anodized. However, it should be appreciated by those having ordinary skill in the related art that the assembly 10, in general, and its components, in particular, can be made by any suitable processes and of any suitable materials. It should be so appreciated also that the assembly 10 can be made of any suitable type of aluminum, stainless steel, or composite components.

The assembly 10 is a durable, effective, engineered, ergonomic, reliable, robust, simple, and versatile safety-anchor assembly for workers. Also, the assembly 10 takes the form of fall-protection tie-off-post-anchor equipment configured to serve as a safety tie-off anchor for workers in specialized applications (e.g., targets primarily commercial-construction projects for concrete-slab applications). And, the assembly 10 is fixed, light, non-disturbing (i.e., no tool or fastener is required to use the assembly 10), portable, and temporary. Furthermore, the assembly 10 can be easily transported and quickly set-up and used by more than one worker at a time. In addition, use of the assembly 10 is practically error-proofed.

The assembly 10 meets applicable "ANSI" and "OSHA" requirements (including that related to maximum "fall arrest" force). Moreover, the assembly 10 is pre-engineered such that the assembly 10 offers a user of the assembly 10 assurance associated with an engineered tie-off anchor and economy of the user being able to install the assembly 10.

The assembly 10 is of "telescoping" design. Plus, the assembly 10 comprises at least one swivel D-ring 56 configured to be used as a tie-off point for a lifeline of the lifeline system 12. The assembly 10 is constructed of aluminum and defines an application height of the assembly 10 of about eight to about ten feet as well.

The invention overcomes the disadvantages in the related art in a safety-anchor assembly of a fall-protection lifeline system for workers configured to be implemented in a work area. The work area defines a lower surface and an upper surface spaced from the lower surface. The assembly comprises a base tube and staff tube adjustably attached to the base tube to form a post shore extending under compression pressure between and frictionally supported upon the lower and upper surfaces of the work area to prevent movement of the post shore with respect to the lower and upper surfaces. An acute angle of about eighty-one degrees is defined between the post shore and lower surface of the work area and a corresponding obtuse angle of about ninety-nine degrees is defined between the post shore and upper surface of the work area.

The invention overcomes the disadvantages in the related art also in the lifeline system of which the safety-anchor assembly is a part.

In a non-limiting exemplary embodiment of the safety-anchor assembly of a fall-protection lifeline system for workers according to the invention, the post shore defines first and second ends of the post shore. The assembly comprises a first support plate positioned between and contacting the first end and the lower surface of the work area for supporting the first end on the lower surface. A second support plate is positioned between and contacting the second end and the upper surface of the work area for supporting the second end on the upper surface.

In an embodiment of the assembly, the assembly is of "telescoping" design.

In an embodiment of the assembly, the assembly comprises an attachment mechanism for telescopingly adjusting the base and staff tubes with respect to each other and, thus, an operative length (i.e., an application height) of the post shore of up to about eight to about ten feet.

In an embodiment of the assembly, the assembly comprises at least one swivel D-ring configured to be used as a tie-off point for a lifeline of the lifeline system.

In an embodiment of the assembly, the assembly is constructed of aluminum.

In an embodiment of the assembly, the assembly comprises a support tube extending non-vertically between the post shore and upper surface of the work area and connected to the post shore and frictionally supported upon the upper surface of the work area.

In an embodiment of the assembly, the assembly comprises a plate extending between a portion of the post shore and support tube and connected thereto for providing structural integrity to the assembly.

In an embodiment of the assembly, the assembly comprises a handle configured to be used for carrying the assembly.

In an embodiment of the assembly, the assembly comprises a cross tube extending under compression pressure along and frictionally supported upon the upper surface of the work area and connected to the post shore and support tube.

In an embodiment of the assembly, the cross tube defines first and second ends of the cross tube. The assembly comprises a third support plate positioned between and contacting the first end of the cross tube and upper surface of the work area for supporting the first end of the cross tube on the upper surface. The second end of the cross tube is connected to the second support plate of the assembly.

An advantage of the safety-anchor assembly of a fall-protection lifeline system for workers according to the invention is that it is a durable, effective, engineered, ergonomic, reliable, robust, simple, and versatile safety-anchor assembly for workers.

Another advantage of the assembly is that it takes the form of fall-protection tie-off-post-anchor equipment configured to serve as a safety tie-off anchor for workers in specialized applications (e.g., targets primarily commercial-construction projects for concrete-slab applications).

Another advantage of the assembly is that it is fixed, light, non-disturbing (i.e., no tool or fastener is required to use the assembly), portable, and temporary.

Another advantage of the assembly is that it can be easily transported and quickly set-up.

Another advantage of the assembly is that it can be used by more than one worker at a time.

Another advantage of the assembly is that use thereof is practically error-proofed.

Another advantage of the assembly is that it meets applicable "ANSI" and "OSHA" requirements (including that related to maximum "fall arrest" force) and all other applicable standards and legislation in the United States and Canada.

Another advantage of the assembly is that it is pre-engineered such that it offers a user thereof assurance associated with an engineered tie-off anchor and economy of the user being able to install the assembly.

Another advantage of the assembly is that the assembly is of "telescoping" design.

Another advantage of the assembly is that it comprises at least one stainless steel swivel D-ring configured to be used as a tie-off point for a lifeline of the lifeline system.

Another advantage of the assembly is that it is constructed of aluminum.

Another advantage of the assembly is that it defines an application height of the assembly of about eight to about ten feet (working range).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A safety-anchor assembly of a fall-protection lifeline system for workers configured to be implemented in a work area defining a lower surface and an upper surface spaced from the lower surface, the lower and upper surfaces of the work area each substantially planar, the lower surface oriented substantially parallel with the upper surface, the assembly comprising:
    a base tube;
    a staff tube adjustably attached to the base tube to form a post shore extending under compression pressure between and frictionally supported upon the lower and upper surfaces of the work area to prevent movement of the post shore with respect to the lower and upper surfaces, an acute angle of about eighty-one degrees being defined between the post shore and the lower surface of the work area and a corresponding obtuse angle of about ninety-nine degrees being defined between the post shore and the upper surface of the work area;
    at least one brace operatively coupled to, and extending angularly from, the base tube to engage the lower surface for stability of the assembly; and
    an adjustable pad disposed at an end of the at least one brace, the adjustable pad pivotably connected to the brace and extendable therefrom, wherein the post shore defines first and second ends of the post shore and the assembly comprises a first support plate positioned between and contacting the first end and the lower surface of the work area for supporting the first end on the lower surface and a second support plate positioned between and contacting the second end and the upper surface of the work area for supporting the second end on the upper surface, wherein the first and second support plates are disposed substantially parallel with the lower and upper surfaces, respectively, of the work area, wherein the assembly comprises a support tube extending non-vertically between the post shore and the upper surface of the work area and connected to the post shore and frictionally supported upon the upper surface of the work area to prevent movement of the support tube with respect to the upper surface, wherein the assembly comprises a plate extending between a portion of the post shore and support tube and connected thereto for providing structural integrity to the assembly, wherein the plate is a substantially triangular Gusset plate fittingly positioned at and near a vertex of an acute angle defined by intersection of the post shore and support tube with each other and integrally connected to the post shore and support tube.

2. The assembly as set forth in claim 1, wherein the base tube matingly receives the staff tube.

3. The assembly as set forth in claim 1, wherein the assembly comprises a handle configured to be used for carrying the assembly.

4. The assembly as set forth in claim 1, wherein the plate extending between a portion of the post shore and support tube includes a scannable image printed thereon, the scannable image providing a downloadable instruction manual.

5. The assembly as set forth in claim 1, wherein the assembly comprises an attachment mechanism for telescopingly adjusting the base relative to the staff tube and, thus, an operative length of the post shore of up to about eight to about ten feet.

6. The assembly as set forth in claim 5, wherein the attachment mechanism includes opposed series of substantially equally spaced holes defined along a portion and through an entirety of the post shore, each of the corresponding pairs of opposed holes substantially aligned with each other, each one of corresponding the pairs of opposed holes configured to matingly receive a removable pin for telescopingly adjusting the application height of the post shore and locking the base and staff tubes to each other for determining the application height of the post shore, wherein the base tube defines at least one of the pairs of opposed holes and the staff tube defines a plurality of the pairs of opposed holes.

7. The assembly as set forth in claim 5, wherein the attachment mechanism includes a plurality of threads defined along a portion of an exterior surface of the post shore and configured to threadingly receive a load washer including a plurality of threads defined along an interior surface of the load washer.

8. The assembly as set forth in claim 7, wherein the load washer includes at least one handle configured to be used to finely adjust a position of the load washer along the post shore after the post shore is in position.

9. A safety-anchor assembly of a fall-protection lifeline system for workers configured to be implemented in a work area defining a lower surface and an upper surface spaced from the lower surface, the lower and upper surfaces of the work area each substantially planar, the lower surface oriented substantially parallel with the upper surface, the assembly comprising:
- a base tube;
- a staff tube adjustably attached to the base tube to form a post shore extending under compression pressure between and frictionally supported upon the lower and upper surfaces of the work area to prevent movement of the post shore with respect to the lower and upper surfaces, an acute angle of about eighty-one degrees being defined between the post shore and the lower surface of the work area and a corresponding obtuse angle of about ninety-nine degrees being defined between the post shore and the upper surface of the work area;
- at least one brace operatively coupled to, and extending angularly from, the base tube to engage the lower surface for stability of the assembly; and
- an adjustable pad disposed at an end of the at least one brace, the adjustable pad pivotably connected to the brace and extendable therefrom, wherein the post shore defines first and second ends of the post shore and the assembly comprises a first support plate positioned between and contacting the first end and the lower surface of the work area for supporting the first end on the lower surface and a second support plate positioned between and contacting the second end and the upper surface of the work area for supporting the second end on the upper surface, wherein the first and second support plates are disposed substantially parallel with the lower and upper surfaces, respectively, of the work area, wherein the assembly comprises a support tube extending non-vertically between the post shore and the upper surface of the work area and connected to the post shore and frictionally supported upon the upper surface of the work area to prevent movement of the support tube with respect to the upper surface, wherein the assembly comprises a cross tube extending under compression pressure along and frictionally supported upon the upper surface of the work area and connected to the post shore and support tube, wherein the cross tube extends substantially horizontally along the upper surface of the work area.

10. The assembly as set forth in claim 9, wherein the base tube matingly receives the staff tube.

11. The assembly as set forth in claim 9, wherein the assembly comprises an attachment mechanism for telescopingly adjusting the base relative to the staff tube and, thus, an operative length of the post shore of up to about eight to about ten feet.

12. The assembly as set forth in claim 11, wherein the attachment mechanism includes opposed series of substantially equally spaced holes defined along a portion and through an entirety of the post shore, each of the corresponding pairs of opposed holes substantially aligned with each other, each one of corresponding the pairs of opposed holes configured to matingly receive a removable pin for telescopingly adjusting the application height of the post shore and locking the base and staff tubes to each other for determining the application height of the post shore, wherein the base tube defines at least one of the pairs of opposed holes and the staff tube defines a plurality of the pairs of opposed holes.

13. The assembly as set forth in claim 11, wherein the attachment mechanism includes a plurality of threads defined along a portion of an exterior surface of the post shore and configured to threadingly receive a load washer including a plurality of threads defined along an interior surface of the load washer.

14. A safety-anchor assembly of a fall-protection lifeline system for workers configured to be implemented in a work area defining a lower surface and an upper surface spaced from the lower surface, the lower and upper surfaces of the work area each substantially planar, the lower surface oriented substantially parallel with the upper surface, the assembly comprising:
- a base tube;
- a staff tube adjustably attached to the base tube to form a post shore extending under compression pressure between and frictionally supported upon the lower and upper surfaces of the work area to prevent movement of the post shore with respect to the lower and upper surfaces, an acute angle of about eighty-one degrees being defined between the post shore and the lower surface of the work area and a corresponding obtuse angle of about ninety-nine degrees being defined between the post shore and the upper surface of the work area;
- at least one brace operatively coupled to, and extending angularly from, the base tube to engage the lower surface for stability of the assembly; and
- an adjustable pad disposed at an end of the at least one brace, the adjustable pad pivotably connected to the brace and extendable therefrom, wherein the post shore defines first and second ends of the post shore and the assembly comprises a first support plate positioned between and contacting the first end and the lower surface of the work area for supporting the first end on the lower surface and a second support plate positioned between and contacting the second end and the upper surface of the work area for supporting the second end on the upper surface, wherein the first and second support plates are disposed substantially parallel with the lower and upper surfaces, respectively, of the work area, wherein the assembly comprises a support tube extending non-vertically between the post shore and the upper surface of the work area and connected to the post shore and frictionally supported upon the upper surface of the work area to prevent movement of the support tube with respect to the upper surface, wherein the assembly comprises a cross tube extending under compression pressure along and frictionally supported upon the upper surface of the work area and connected to the post shore and support tube, wherein the cross tube defines first and second ends of the cross tube, the assembly comprises a third support plate positioned between and contacting a second end of the support tube and the upper surface of the work area for supporting the second end of the support tube on the upper surface, and the second end of the cross tube is connected to the second support plate of the assembly.

15. The assembly as set forth in claim 14, wherein the third support plate is disposed substantially parallel with the upper surface of the work area.

16. The assembly as set forth in claim 14, wherein the base tube matingly receives the staff tube.

* * * * *